United States Patent [19]

Tomasi

[11] Patent Number: 4,464,662

[45] Date of Patent: Aug. 7, 1984

[54] DETERMINING AZIMUTH OF A TRANSPONDER BY MEASURING A PLURALITY OF PHASE SHIFTS

[75] Inventor: Jean-Pierre Tomasi, Velizy, France

[73] Assignee: U.S. Philips Corporation, New York, N.Y.

[21] Appl. No.: 256,744

[22] Filed: Apr. 22, 1981

[30] Foreign Application Priority Data

Apr. 25, 1980 [FR] France .................................. 80 09412

[51] Int. Cl.³ .......................... G01S 3/46; G01S 13/78
[52] U.S. Cl. .................................. 343/16 R; 343/7.5; 343/17.5
[58] Field of Search ................... 343/16 R, 16 M, 17.5

[56] References Cited

U.S. PATENT DOCUMENTS 4,110,754 8/1978 Endo ................................ 343/16 R Primary Examiner—T. H. Tubbesing
Attorney, Agent, or Firm—Robert J. Kraus

[57] ABSTRACT

A method for determining the azimuth $\alpha$ of a transponder relative to a radar system which transmits a frequency F varying linearly with time. The system comprises two receiving antennas disposed at a distance d from each other and produces two beat signals $Fb_1$ and $Fb_2$, formed by mixing the transmitted wave with each of the two echo waves received from the transponder. The phase shift $\psi$ between $Fb_1$ and $Fb_2$ at a first time t, and frequency f, and the phase shift $\psi'_o$ at a second time $t_2$ and frequency $f_2$ is measured, and the overall phase shift $\psi$ between $Fb_1$ and $Fb_2$ is calculated. The value of $\alpha$ is calculated from the values $F_1$, d and $\psi$.

8 Claims, 4 Drawing Figures

DETERMINING AZIMUTH OF A TRANSPONDER BY MEASURING A PLURALITY OF PHASE SHIFTS

BACKGROUND OF THE INVENTION

The invention relates to a method of determining the azimuth $\alpha$ of a radiowave transponder relative to a radar system which transmits a wave having a frequency F which varies linearly with time. The radar system includes a transmitting antenna and two receiving antennas, which are located at a distance d from each other. Two beat signals $Fb_1$ and $Fb_2$ having frequencies $fb_1$ and $fb_2$, respectively, are obtained by mixing the transmitted wave and the echo wave received from the transponder at each of the two receiving antennas.

The invention also relates to an apparatus for measuring the azimuth $\alpha$ using the above method. The apparatus forms part of a radar system which transmits a high frequency continuous wave, which is frequency modulated with a sawtooth having a constant frequency sweep $\Delta F$ and a duration T, and which simultaneously receives the previously transmitted wave which is returned by a transponder. The radar system supplies a signal $Fb_1$ of a first beat frequency $fb_1$, obtained by mixing the transmitted signal of the instantaneous frequency F and the signal received at a first receiving antenna, and a signal $Fb_2$ of a second beat frequency $fb_2$, obtained by mixing the transmitted signal of the frequency F and a signal received at a second receiving antenna. The reference direction for measuring the azimuth $\alpha$ of the transponder is perpendicular to a line section of length d at whose ends the receiving antennas are located.

The azimuth angle $\alpha$ to be determined is the angle between a predetermined direction, for example a reference axis associated with the apparatus for measuring $\alpha$, and an axis which extends from the measuring apparatus to a target whose angular location is to be determined. Suitably, the measuring station is located on the ground, the measuring apparatus comprises a radar interrogator, and the target is an aircraft equipped with a transponder. The measuring station may alternatively be an aircraft. In practice, the angle $\alpha$ to be determined is suitably the angle between the mid-perpendicular plane to the receiving antennas of said radar system and the axis between the radar system and the target. On the other hand, the transponder associated with the target may be a simple passive reflector, in so far that it is isolated in the space surrounding it.

The apparatus used for carrying out the invention may, as far as the radar interrogator is concerned, for example be of the type known from French Patent Specification No. 1,557,670 corresponding to U.S. Pat. No. 3,588,899. The radar system comprises a second receiving antenna by means of which a second beat signal $Fb_2$ of the frequency $fb_2$ is obtained by mixing the transmitted wave and the wave received by the second receiving antenna in a second mixer. Such a radar system serves as a distance measuring apparatus and to this end it comprises a control loop which maintains the first beat signal $Fb_1$ at a substantially constant frequency $fb_1$ as the distance varies. This results in a variation of the duration of the transmitted sawtooth as a linear function of the distance for a constant frequency sweep $\Delta f$ of the sawtooth.

It is to be noted that the invention is not limited to this type of apparatus. It equally applies to a radar system which transmits a sawtooth of constant frequency, duration and frequency sweep and which supplies two beat signals $Fb_1$ and $Fb_2$ obtained by mixing of the transmitted wave and the echo wave received from the transponder.

The transponder used is for example of the type described in French Patent Specification No. 2,343,258, corresponding to U.S. Pat. No. 4,151,525 in particular with reference to FIGS. 9 and 10, by means of which the azimuth of the target can be calculated at distances greater than 100 km.

By means of the two distance measuring apparatus of the type described in the French Patent Specification No. 1,557,670, having a common transmitting antenna and each having one receiving antenna, the azimuth can be determined in known manner from two distances measured by triangulation using the formula:

$$\sin \alpha = \frac{R_1 - R_2}{d}$$

in which:

d is the (fixed) distance between the receiving antennas $R_1$ is the distance between the transponder and one receiving antenna $R_2$ is the distance between the transponder and the other receiving antenna.

The principle of determining $\alpha$ is described in more detail in the previously mentioned French Patent Specification No. 2,343,258.

When $\alpha$ is thus determined this has the drawback that at least one distance measuring apparatus is necessary (by alternately switching the control loop from one receiving antenna to the other in which case the frequencies $fb_1$ and $fb_2$ are equal) and that the measurement of $\alpha$ is not very accurate because of the length of the signal-processing chain necessary to enable the distances $R_1$ and $R_2$ and their difference to be determined, which leads to an accumulation of the absolute errors produced by the various signal-processing elements, the cumulative error increasing as the distance R increases.

It is also possible to determine the angle $\alpha$ by means of the formula:

$$\sin \alpha = \frac{cT}{\Delta Fd}(fb_2 - fb_1)$$

c being the velocity of propagation of an electromagnetic wave.

Such a method of determining $\alpha$ by measuring T, $fb_1$ and $fb_2$ has the same drawbacks as described in the foregoing.

SUMMARY OF THE INVENTION

It is an object of the invention to obtain a comparatively high accuracy measurement of $\alpha$, for example of some hundredths of degrees, using simple radar equipment. The accuracy should be of the same order of magnitude as that obtained by means of an aircraft landing radar system (ILS system). More specifically, it is an object of the invention to obtain this high accuracy by means of only two antennas, while in conventional angle measuring systems this is achieved by means of a large number of antennas (interferometers with a plurality of antennas).

In accordance with the invention, the method defined in the opening paragraph comprises the following steps:

The algebraic measurement of the phase shift $\phi_o$ between the signals Fb$_1$ and Fb$_2$ and the measurement of the frequency F$_1$ at a predetermined, arbitrarily chosen first instant t$_1$, The algebraic measurement of the phase shift $\phi'_o$ between the signals Fb$_1$ and Fb$_2$ and the measurement of the frequency F$_2$ at a second arbitrarily chosen instant t$_2$, $\phi'_o - \phi_o$ being such that the number of sinewave periods of fb$_1$ and fb$_2$ between the two instants t$_1$ and t$_2$ is substantially the same, The calculation of a relative overall phase variation $\Delta\phi$ which may be greater than $2\pi$ between the instants t$_1$ and t$_2$, by determining the difference between $\phi'_o$ and $\phi_o$, The approximated calculation of $\phi$, which is the overall phase shift between the signals Fb$_1$ and Fb$_2$ at the first instant t$_1$, the time origin being when the frequency F is zero, as a function of F$_1$, F$_2$ and the value of $\Delta\phi$ found in the preceding step, that is $\phi_{\Delta\phi}$, The determination of the maximum angle $2k\pi$, k being a positive integer which is actually contained in the angle $\phi$, from $\phi_o$, $\phi_{\Delta\phi}$ found in the preceding step and of the respective signs of $\phi_o$ and of $\Delta\phi$, Making $\phi$ identical to the sum: $\phi_o + 2k\pi$ or $\phi_o - 2k\pi$ depending on the respective signs of $\phi_0$ and of $\Delta\phi$, The calculation of sin $\alpha$ from the values of F$_1$, d and the exact value of $\phi$ found in the preceding step, The calculation of $\alpha$ from the value of sin $\alpha$ obtained in the preceding step, The display of the value of $\alpha$ found in the preceding step.

Similarly, in order to obtain a high accuracy for $\alpha$, the apparatus defined in the introduction is characterized in that it comprises:

First means for shaping the signals Fb$_1$, Fb$_2$ of the frequencies fb$_1$ and fb$_2$ to obtain squarewave signals of the same phase and the same frequency, Second means for measuring the phase shift $\phi_0$ between the squarewave signals of the frequencies fb$_1$ and fb$_2$, as well as the frequency F for at least one point of said sawtooth, Third means for determining at least two trains of squarewave signals having the same number of periods and whose starting points differ by less than one period, Fourth means for measuring the overall relative phase variation $\Delta\phi$ between the beginning, at the instant t$_1$ for a frequency F$_1$, and the end, at the instant t$_2$ for a frequency F$_2$, of the trains of sqaurewave signals, Fifth means for calculating the angle $\alpha$ from the values of F$_1$, F$_2$, d, $\phi_o$ and $\Delta\phi$ and for displaying the angle.

By means of a simple formula, mentioned in the detailed description, it is possible to calculate the value of sin $\alpha$ for a given point of the sawtooth from the value $\phi$ of the overall phase shift between Fb$_1$ and Fb$_2$ with the required accuracy. The value $\phi_o$ measured for this point of the sawtooth only represents the portion of $\phi$ which is smaller than $2\pi$.

The basic concept of the invention is to determine the angle $2k\pi$ which, when added to $\phi_o$, yields the angle $\phi$. This is possible by measuring the phase shift $\phi'_o$ for at least a second point of the sawtooth. Thus, if the phase shifts $\phi_o$, $\phi'_o$ are measured with an accuracy of the order of, for example, 1°, that is a relative error of the order of 0.5%, it is possible to obtain the angle $\phi$ with a much higher relative accuracy. Indeed, the overall phase shift between Fb$_1$ and Fb$_2$ is obtained with a relative accuracy on the order of 1° in several thousands of degrees. This high accuracy is then also obtained for $\alpha$.

BRIEF DESCRIPTION OF THE DRAWINGS

The following description, with reference to the accompanying exemplary drawings, enables the invention to be more fully understood. Corresponding elements bear the same reference numerals.

DESCRIPTION OF THE PREFERRED EMBODIMENTS

Figure 1:
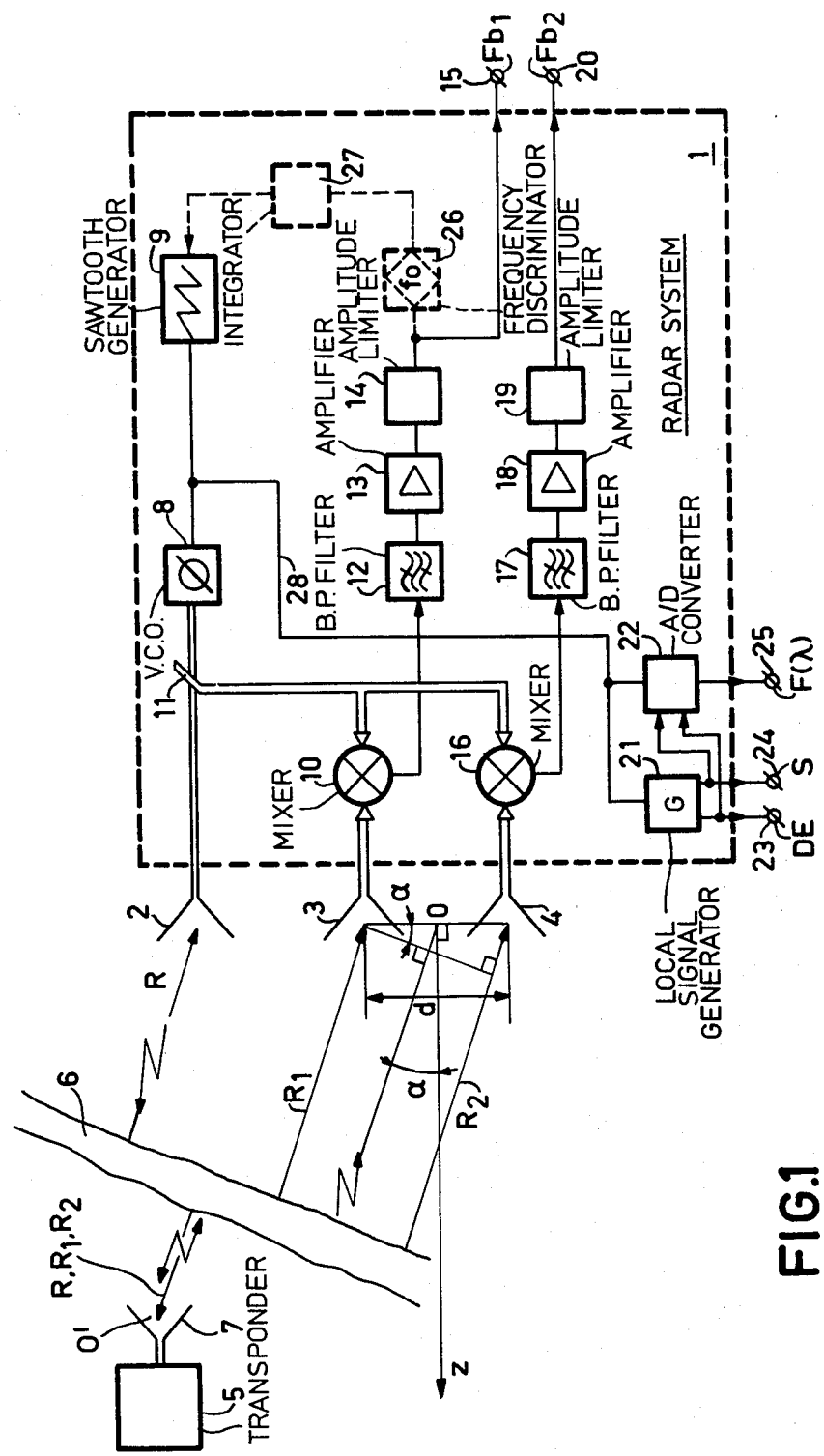
FIG. 1 is the simplified block diagram of a radar system which simultaneously transmits and receives a high frequency continuous wave, which is frequency-modulated as a sawtooth and which provides the signals necessary for carrying out the invention.

FIG. 1 represents a radar system 1, which may be a radio altimeter or a distance measuring apparatus using high-frequency continuous waves which are frequency-modulated in accordance with a sawtooth waveform. The system comprises a transmitting antenna 2 as well as two receiving antennas 3 and 4 situated at a distance d from each other. The radar system 1 forms part of a system which further comprises a transponder 5, represented at the left in FIG. 1, whose distance 6 from the radar system may exceed 140 km. The transponder 5 suitably comprises a single transmitting/receiving antenna 7 at o'. In order to ensure that the wave received from the antenna 2 is returned to the antennas 3 and 4 of the radar system 1 with sufficient power, especially in the case of longer distances, the transponder 5 is suitably of the type described in French Patent Specification No. 2,343,258, in particular with reference to FIGS. 9 and 10 of said Specification, or a transponder of comparable design and performance. This type of transponder comprises a delay line which provides a delay $\tau_o$ of microsecond order between the received signal and the retransmitted signal, an amplifier, and means, in the form of at least one radio-frequency switch for sampling the received signal at a frequency of the order of some hundreds of kilohertz. The radar system 1 is adapted to analyze the signals returned to its receiving antennas 3 and 4 by the transponder 5 in order to obtain output signals which, in accordance with the invention, enable the value of the angle $\alpha$, which is the azimuth angle of the transponder relative to the radar system, to be determined with an accuracy of the order of some tens of degrees. In FIG. 1, $\alpha$ is the angle between a direction $\overrightarrow{oz}$, perpendicular to a line section of length d which interconnects the centers of the antennas 3 and 4, and the direction $\overrightarrow{oo'}$.

The transmitting section of the radar system 1 comprises a voltage-controlled oscillator 8 connected to the transmitting antenna 2. The input of the oscillator receives the output signal of a sawtooth generator 9.

The receiving section is constituted by two identical signal processing chains. The first chain comprises a mixing circuit 10 having a first input connected to the output of the antenna 3 and a second input connected to the output of the oscillator 8 via a coupler 11. An output of the mixing circuit 10 is connected to cascaded elements including a band-pass filter 12, an amplifier 13 and an amplitude limiter 14. The mixer 10 forms the difference frequency of the transmitted wave and the received wave, yielding a signal Fb₁ of frequency fb₁ on an output terminal 15, which frequency is the instantaneous difference frequency between the wave transmitted at 2 and the wave received at 3. Like the first chain, the second chain includes cascaded elements including the receiving antenna 4, a mixer 16, a band-pass filter 17, an amplifier 18 and an amplitude limiter 19. The second input of the mixer 16 is also connected to the coupler 11. The output of the amplitude limiter 19 produces a signal Fb₂ of frequency fb₂ on its output terminal 20, which frequency is the instantaneous difference between the frequencies of the wave transmitted at 2 and the wave received at 4. The radar system 1 also comprises two elements 21 and 22 which receive via a conductor 28 the output voltage of the sawtooth generator 9. The element 21 is a logic signal generator which produces signals DE and S on outputs 23 and 24, and the element 22 produces a signal F (λ) on a terminal 25. The signals DE and S are also supplied to the element 22. The function of these elements 21 and 22 will be described hereinafter with reference to FIGS. 3 and 4. FIG. 1 also shows a frequency discriminator 26, operating at a central frequency $f_o$, and an integrator 27 arranged in cascade between the output of the amplitude limiter 14 and a control input of the sawtooth generator 9. Their presence is optional, which is indicated by the broken lines, and their function will be described hereinafter.

Figure 2:
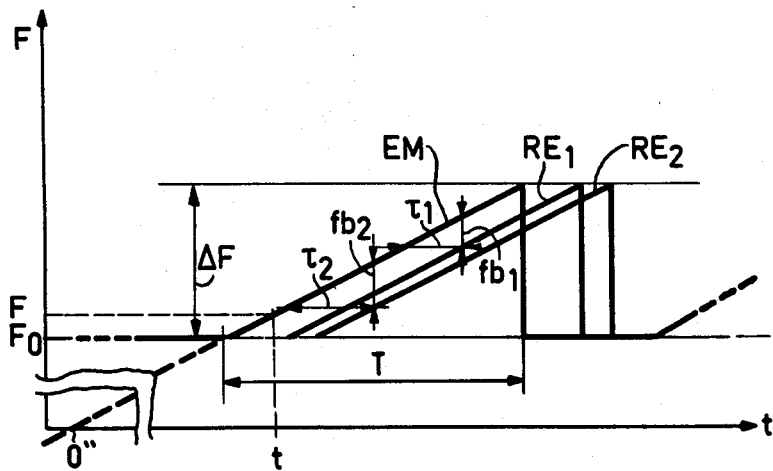
FIG. 2 represents the frequency variation of the transmitted and received signals as a function of time.

FIG. 2 represents frequency curves as a function of time. The curve EM represents the signals transmitted at 2 and 11 and the curves RE₁ and RE₂ represent the signals received at 3 and 4.

The curve EM has the form of a sawtooth with a fixed or variable duration T and a frequency sweep ΔF, which is preferably constant. Although an asymmetric sawtooth is shown, a symmetric sawtooth may also be used. The frequency $F_o$ is the frequency at the beginning of the sawtooth. In practice $F_o$ is of the order of magnitude of GHz and ΔF is of the order of magnitude of ten or some tens of MHz. When the Doppler effect is ignored and the waves received at 3 and 4 are continuous, the curves RE₁ and RE₂ can be derived from the curve EM by a translation parallel to the time axis, with a duration $\tau_1$ and $\tau_2$, respectively. Referring now to FIG. 1, $\tau_1$ is the time which the wave needs to cover the distance R between the antennas 2 and 7, to pass through the transponder 5 (time $\tau_o$) and to cover the distance R₁ between the antennas 7 and 3 in the other direction, namely:

$$\tau_1 = \frac{R + R_1}{c} + \tau_o \quad (1)$$

Similarly:

$$\tau_2 = \frac{R + R_2}{c} + \tau_o \quad (2)$$

The respective beat frequencies fb₁ resulting from mixing RE₁ and EM, and fb₂ resulting from mixing RE₂ and EM may be represented by the formulas:

$$fb_1 = \left(\frac{R + R_1}{c} + \tau_o\right) \frac{\Delta F}{T} \quad (3)$$

$$fb_2 = \left(\frac{R + R_2}{c} + \tau_o\right) \frac{\Delta F}{T} \quad (4)$$

It is to be noted that RE₁ and RE₂ are only the envelopes of the waves received by the radar system. Indeed, for the given type of transponder which is preferably used, the wave returned by the latter is chopped at the sampling frequency, that is for each sampling cycle of a duration which is typically 2 μs, it is only present on the output of the transponder 5 for approximately 1 μs. It follows that the beat signal of the frequency fb₁ (or fb₂) at the output of the mixer 10 or 16 itself is sampled at the sampling frequency of the transponder, which is of the order of 500 kHz. The function of the band-pass filter 12 or 17 is to recover the beat signal in the form of a sine-wave of the frequency fb₁ or fb₂ by eliminating the components of the sampling frequency and multiples thereof from the spectrum of the signal which is received. This is possible if the frequencies fb₁ and fb₂ are smaller than half the sampling frequency, that is, for example 250 kHz (Shannon theorem).

When the sawtooth is constant (T and ΔF constant), the criterion given in the preceding paragraph imposes a limitation on the distance between the radar system and the transponder in view of formulas (3) and (4). In order to avoid this limitation, the sampling frequency may be increased (by reducing the duration $\tau_o$ of the transponder) and/or the ratio (ΔF/T) may be reduced by influencing the values of ΔF and T in the radar system, in such a way that the distance limit imposed by the sampling frequency becomes greater than the distance limit imposed by the maximum gain of the transponder 5.

In a preferred embodiment of the invention one of the beat frequencies fb₁ or fb₂ is maintained substantially equal to a constant frequency $f_o$ by means of a control loop in the transmitting section of the radar system. This control loop includes the oscillator 8, the coupler 11, the mixer 10, the filter 12, the amplifier 13, the amplitude limiter 14, the frequency discriminator 26, the integrator 27, and the sawtooth generator 9. The output signal of the discriminator 26 influences the generator 9 via the integrator 27 in such a way that the slope of the sawtooth varies as a function of the distance to the transponder, to maintain the frequency fb₁ constant. In this type of distance measuring apparatus, which is for example known from the French Patent Specification No. 1,557,670, the duration T of the sawtooth is a linear function of the distance between the transponder and the radar system, thereby enabling this distance to be measured. The control loop functions to ensure that substantially constant values are obtained for fb₁ and fb₂ (the value of fb₂ being very close to that of fb₁) independently of the distance between the radar system and the transponder, which ensures that the sampling theorem is complied with. In practice, the frequency $f_o$ is of the order of some tens of kilohertz, that is, an order of magnitude smaller than the sampling frequency.

Referring now to the left-hand part of FIG. 1, the line sections representing the distances R, R₁ and R₂ from the antenna 7 to the antennas 2, 3 and 4, respectively, are sufficiently long that they may be considered to be parallel to a reasonable approximation. As a result of this, the line perpendicular to the line OO′ (and to the line sections $R_1$ and $R_2$) from the center of the antenna 3 makes an angle $\alpha$ with the line section of the length d. It follow that:

$$\sin \alpha = \frac{R_2 - R_1}{d} \tag{5}$$

On the other hand, subtracting formulas (3) and (4) from each other yields:

$$fb_2 - fb_1 = \frac{R_2 - R_1}{c} \frac{\Delta F}{T} \tag{6}$$

The difference $fb_1 - fb_2$, may be expressed as a number of periods which linearly increase with time or rather an "overall phase shift" $\phi$, whose absolute value is greater than $2\pi$, which may be expressed by:

$$\phi = 2\pi(fb_1 - fb_2)t \tag{7}$$

when taking a suitable origin for t, that is for each sawtooth the points o″ where the line corresponding to the curve EM in FIG. 2 intersects the horizontal axis.

Formula (7) may be written as follows using formula (6):

$$\phi = \frac{2\pi(R_1 - R_2)}{c} \frac{\Delta F}{T} t \tag{8}$$

The expression for the curve F as a function of time for each sawtooth is then: $F = (\Delta F/T) t$ when taking the same origin o″ as above for t. Formula (8) may then be written as follows:

$$\phi = \frac{2\pi(R_1 - R_2)}{c} F \tag{9}$$

Combining equations (5) and (9). yields:

$$\phi = \frac{2\pi Fd}{c} \sin \alpha \tag{10}$$

or:

$$\sin \alpha = \frac{c}{2\pi Fd} \phi \tag{11}$$

In equation (11) the values of F (or of $\lambda = (c/F)$) and d are known with excellent accuracy, but the angle $\phi$ cannot be measured directly: it is only possible to measure its algebraic value $\phi_o$ with a suitable accuracy of the order of one degree, whose period is smaller than $2\pi$ and whose sign is either that for $\phi$ (and thus for $\alpha$) or the opposite sign. Measuring $\phi_o$, which is actually a phase measurement, therefore gives rise to an indeterminate factor and does not suffice for a correct evaluation of $\phi$ with an accuracy of one degree, because the absolute value of the angle $\phi$ is of the order of some hundreds to some thousands of degrees.

The angle $\phi$ may therefore be expressed as a function of $\phi_o$ by means of one of the following two formulas:

$$\phi = \phi_o + 2k\pi \text{ if } \phi \text{ is positive} \tag{12}$$

$$\phi = \phi_o - 2k\pi \text{ if } \phi \text{ is negative}$$

where k is a positive integer.

In order to remove the ambiguity associated with the measurement of $\phi_o$, it is to be noted that because F varies during the sawtooth modulation $\phi$ will also vary, so that for example between the beginning ($\phi_1$, $F_1$) and the end ($\phi_2$, $F_2$) of the sawtooth:

$\Delta\phi = \phi_2 - \phi_1$, so that because of formula (10):

$$\Delta\phi = \frac{2\pi d \sin \alpha}{c} (F_2 - F_1) \text{ or:} \tag{13}$$

$$\Delta\phi = 2\pi d \frac{\Delta F}{c} \sin \alpha$$

or:

$$\sin \alpha = \frac{c}{2\pi d \Delta F} \Delta\phi \tag{14}$$

$\Delta\phi$ is an electrical angle which has the sign of $\alpha$ and which for the use in accordance with the invention rarely exceeds $2\pi$. It is to be noted that when $\Delta\phi$ is greater than $2\pi$, its value can be measured because it concerns the variation of the relative phase shifts of the two signals during a given interval of time which only comprises a fairly limited number of periods for the signals $Fb_1$ and $Fb_2$.

For an accuracy of the measurement of $\Delta\phi$ comparable to the accuracy obtained for $\phi_o$, that is approximately one degree, formula (13) yields an accuracy for $\sin \alpha$ which is lower than formula (11), as will be seen hereinafter, but on the other hand this enables $\sin \alpha$ to be determined without ambiguity.

According to the invention the amplitude and sign of the angle $\Delta\phi$ is measured. This sign is also that of $\alpha$ and thus of $\phi$ because of formulas (14) and (11). The value of $\sin \alpha$ is calculated from formula (14), which value is designated $\sin \alpha_{\Delta\phi}$. The value of $\sin \alpha_{\Delta\phi}$ is inserted in formula (10) and a first approximated value of the angle $\phi$ is calculated therefrom, which is designated $\phi_{\Delta\phi}$. On the other hand $\phi_o$ is also measured and is preferably made identical to $\phi_1$. Comparison of the signs of $\Delta\phi$ and $\phi_o$ makes it possible to decide which of the formulas (12) is valid for the determination of k ($\phi$ and $\Delta\phi$ have the same signs). For example, if the second of these formulas is valid, the value of k is defined as the integer nearest the calculated value, which is equal to $$\frac{\phi_o - \phi_{\Delta\phi}}{2\pi}.$$

Now $\phi$ is calculated in an inverse manner by means of the same formula (12) with which k has been determined, using the integer found for k and, finally, the last-mentioned correct value found for $\phi$ is inserted into formula (11), which then enables the value of $\sin \alpha$ and thus the value of $\alpha$ to be calculated with the desired accuracy. Differentiation of formula (10) yields:

$$\frac{d\phi}{d\alpha} = \frac{2\pi Fd}{c} \cos \alpha \tag{15}$$

which, when assuming for example that: d=4 m and $F = F_1 = 1.22$ GHz, yields:

for $\alpha = 0$  $d = 0.0097 d\phi$ for $\alpha = 30°$  $d = 0.0112 d\phi$ that is, an error of ±1° where φ corresponds approximately to 0.01° for α.

Conversely, if α is to be determined from the value of Δφ only, differentiation of formula (13) yields:

$$\frac{d(\Delta\phi)}{d\alpha} = \frac{2\pi\Delta F d}{c} \cos\alpha$$

or when it is for example assumed that: d=4 m and ΔF=10 MHz (F$_1$=1.22 GHz, F$_2$=1.23 GHz):

$$d\alpha = \frac{1.2}{\cos\alpha} d(\Delta\phi). \quad (16)$$

In this case the accuracy obtained for α varies for ±1.2° for α=0 to ±1.4° for α=30°, with an accuracy of ±1° for Δφ. Thus, this is clearly insufficient in comparison with the desired accuracy.

It is to be noted that for d=4 m and F$_1$=1.22 GHz, the angle φ varies by 2π when α varies by 3.4 degrees at 0° or by 4 degrees at 30 degrees. The accuracy obtained for α by means of formula (16) is therefore sufficient to ensure that the correct value of k can be determined by means of one of the formulas (12). If the accuracy is no longer sufficient, this may be solved by increasing the value of d and/or that of ΔF.

An embodiment of the invention, which employs the measuring and calculation method explained in the foregoing, is now described with reference to FIGS. 3 and 4. In this embodiment the phase shifts are preferably measured by the comparison of counted numbers of clock pulses, the number of pulses being counted between the zero passages of the beat signals Fb$_1$ and Fb$_2$.

The instants marking the beginning and end of the phase measurement during a sawtooth may be selected arbitrarily, provided that the wavelength or frequency emitted at these two instants is known. The first instant is for example selected to correspond to the beginning of the sawtooth and the second instant to correspond to 90% of the excursion of the sawtooth or: ΔF'=0.9ΔF.

Figure 3:
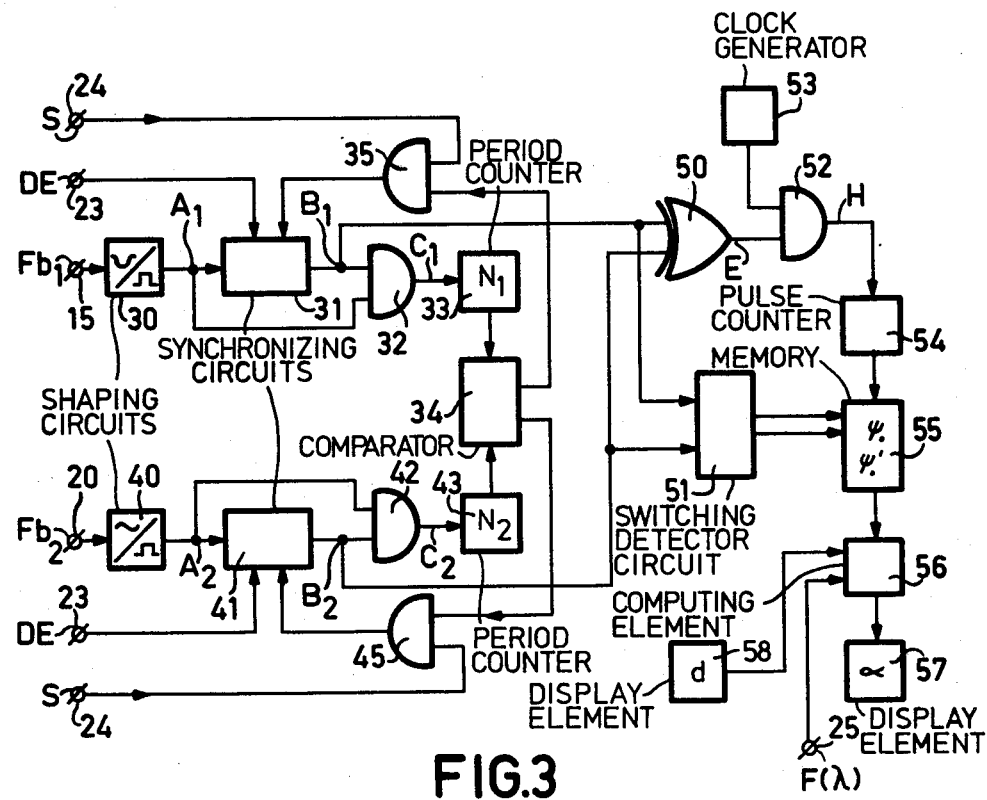
FIG. 3 is the block diagram of an embodiment of the invention.

The device of FIG. 3 comprises two identical signal-processing chains, whose inputs respectively receive the signal Fb$_1$ on terminal 15 and the signal Fb$_2$ on terminal 20. The chain receiving a signal Fb$_1$ (Fb$_2$) comprises a cascade of: a shaping circuit 30 (40), which shapes the sinewave signal which it receives into squarewave signals, a synchronizing circuit 31 (41), an AND-gate circuit 32 (42), a period counter 33 (43), and a comparator 34. The outputs of the elements 30, 31 and 32 supply the signals A$_1$, B$_1$, C$_1$, respectively. The signal A$_1$ (A$_2$) is supplied directly to a second input of the AND-gate circuit 32 (42). Furthermore, a first (second) output of the comparator 34 is connected to an AND-gate circuit 35 (45), which at a second input receives the signal S from terminal 24 and whose output is connected to a second input of the synchronizing circuit 31 (41). On a third input the circuit 31 (41) receives the signal DE from the terminal 23. The signals B$_1$ and B$_2$ are applied to an exclusive-OR gate 50 and to a first switching detector circuit 51. The output of the gate circuit 50, on which the signal E appears, is followed by a cascade of: an AND-gate 52, which receives the output signal of a fast clock generator 53 on the second input and whose output supplies a signal H, a pulse counter 54, a memory 55, a computing element 56 for calculating Δφsin αΔφ, φΔφ, k, φ, sin α and α and a display element 57 for displaying the value of α. The circuit 51, whose function is to determine the signs of the measured phase shifts, transfers said signs, for example in the form of logic levels, to the memory 55 via two conductors. The computing element 56 receives in digital form, the value of the distance d, which is displayed by an element 58, and the value of the transmitted frequency F (or the wavelength λ) which is transferred to terminal 25 at the instants (t$_1$, t$_2$) which respectively correspond to the transition to the high level of the logic signals DE and S, which in FIG. 1 is indicated by the conductors which connect each of the terminals 23 and 24 to a control input of the analog-to-digital converter 22.

The operation of the apparatus of FIG. 3 is described hereinafter with reference to FIG. 4, which is a time diagram of the signals EM, DE, S, Fb$_1$, A$_1$, B$_1$, C$_1$, Fb$_2$, A$_2$, B$_2$, C$_2$, E, H. In FIG. 4 the signal G is a fixed frequency threshold, determined by the element 21 of FIG. 1, for example equal to 90% of the peak value of the sawtooth (ΔF'=0.9 ΔF) and S is a logic signal which changes from 0 to 1 when the threshold G is reached and which returns to 0 at the end of the sawtooth.

The phase shift between the echo signals received by the antennas 3 and 4 is imparted to the beat signals of the frequencies fb$_1$ and fb$_2$ by means of mixers 10 and 16 (FIG. 1). The best signals are available in the form of continuous sinewaves at respective terminals 15 and 20 (FIG. 1), in which form they are shown in FIG. 4. By means of the circuits 30, 40 (FIG. 3) the signals Fb$_1$ and Fb$_2$ are shaped into squarewave signals A$_1$, A$_2$ having amplitudes adapted to suit the following logic circuits (logic levels "0" and "1"). The synchronizing circuits 31, 41 have outputs B$_1$, B$_2$, which are 0 between the sawtooth waves and which becomes 1 upon the first change from 0 to 1 of the signal A$_1$ or A$_2$ following the instant t$_1$, beginning the sawtooth. For this purpose, the synchronizing circuits 31, 41 receive the signal DE on its third or "start" input. When, at the instant t$_2$, each circuit 31, 41 receives a signal on its second or "stop" input, B$_1$ and B$_2$ will return to 0 upon the next transition from 0 to 1 of the respective signal A$_1$ or A$_2$. Such logic circuits 31, 41 are known to those skilled in the art. The AND gates 32 and 42, which receive the signals A$_1$, B$_1$ and A$_2$, B$_2$, produce integral numbers N$_1$, N$_2$ of periods C$_1$, C$_2$ at their respective outputs. The counters 33, 43 each supply a number equal to the number of sinewave periods of Fb$_1$ or Fb$_2$ during the interval under consideration. When the signal S changes to the 1 level causing the signals B$_1$, B$_2$ to be reset to zero via the AND-circuits 35, 45, one of the two following modes of operation of the apparatus is possible.

(1) N$_2$≧N$_1$ (case considered in FIG. 4), in which case the comparator 34 transfers a logic "1" via the AND-gate 45, which resets the output B$_2$ of the synchronizing circuit 41 to zero during the following passage from 0 to 1 of the period A$_2$. The AND-gate circuit 35 remains closed (inhibited) until N$_1$=N$_2$. At this instant the first output of the comparator 34 also goes to 1, which pulls the synchronizing circuit 31 to 0 via the gate circuit 35. The AND-gate circuits 42 and 32 thus have supplied the same number of periods and the durations of the "1" levels of the signals B$_1$ and B$_2$ represent the respective durations of the same number of sinewave periods in the two respective signal processing chains Fb$_1$ and Fb$_2$.

(2) N$_1$≧N$_2$, in which case the operations in the two chains described in the foregoing are interchanged, and by means of the same reasoning the same result is obtained as in the preceding paragraph.

Figure 4:
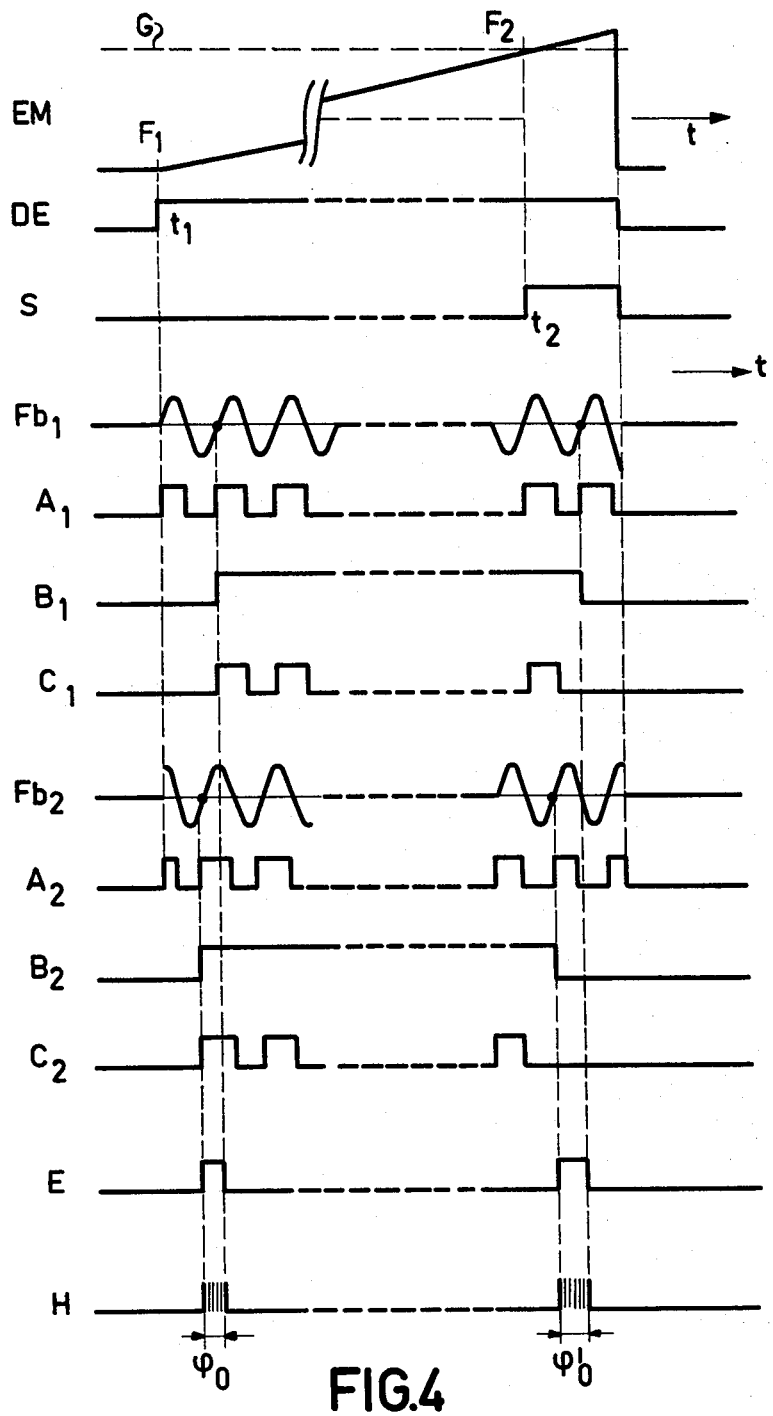
FIG. 4 is a time diagram illustrating the operation of the circuits shown in FIGS. 1 and 3.

The signals $B_1$ and $B_2$ are, for example, as shown in FIG. 4, but other configurations are also possible because first either $B_1$ or $B_2$ switches from the low level to the high level (first and second switching operation) and subsequently either $B_1$ or $B_2$ changes from the high level to the low level (third and fourth switching operation).

The sign of $\phi_0$ depends on the chronological sequence of the first and the second switching operation. By convention, it is for example decided to count $\phi_0$ positively when the first switching operation takes place in the first signal processing chain and negatively if this takes place in the second chain. This convention, as will be seen hereinafter, allows the value of $\alpha$ to be determined in a trigonometric sense. In accordance with this convention the angle $\phi_0$ is negative in FIG. 4.

On the other hand, the difference between the durations of the high levels of the signals $B_1$ and $B_2$ represents the absolute value of the relative overall phase shift $\Delta\phi$. The absolute value and the sign of $\Delta\phi$ can be obtained by algebraically measuring $\phi'_0$, that is, the algebraic difference between the falling edges of the signals $B_1$ and $B_2$ (third and fourth switching operations) with the same sign convention as in the foregoing and by subtracting the algebraic value obtained for $\phi_o$ from said algebraic value (first and second switching operations), which rule is valid regardless of the configuration of the signals $B_1$ and $B_2$. The sign obtained for $\Delta\phi$ is also the sign of $\alpha$ because of formula (14).

In FIG. 4 the two measured phase shifts are negative, their difference (the second one minus the first one) is negative, which means that the angle $\alpha$ is negative when the axis oz is taken as the origin (which case is represented in FIGS. 1 and 2). It is to be noted that FIGS. 1, 2 and 4 represent the same case, for which the following inequality is valid: $Fb_2 > Fb_1$. If the beat frequency $Fb_1$ is maintained constant and equal to a predetermined value, for example 25 kHz (period of 40 $\mu$s), if $B_1$ has a delay of 10 $\mu$s at the beginning and of 20 $\mu$s at the end, then:

The initial phase shift $\phi_0$ is:

$$2\pi \times \frac{-10}{40} = -\frac{\pi}{2} = -90°$$

The final phase shift $\phi'_0$ is:

$$2\pi \times \frac{-20}{40} = -\pi = -180°$$

The variation of the phase shift $\Delta\phi$ is consequently:

$$(-\pi) - \left(-\frac{\pi}{2}\right) = -\frac{\pi}{2} = 90°.$$

When the variation of the transmitted frequency, on terminal 25, between the beginning and the end of counting is known, that is, $F_2 - F_1$, the value of $\sin \alpha$ can be calculated from this variation in a first approximation (accuracy of the order of one degree for arc sin $\alpha$).

The actual circuit for measuring and calculating $\alpha$ from time measurements representing the phase shifts $\phi_0$ and $\Delta\phi$ is shown in the right-hand part of FIG. 3 (the elements 50 to 58).

The exclusive-OR gate circuit 50 receives the two signals $B_1$ and $B_2$ and supplies the signal E (FIG. 4), which for a given sawtooth comprises two pulses representing the initial and final phase shifts $\phi_0$ and $\phi'_0$. Via the AND-gate circuit 52, which also receives the output signal of the fast clock generator 53, the signal E is converted into a counting pulse signal H with a frequency of, for example, 20 MHz. At the end of each train of pulses supplied by the AND-gate 52 the counter 54, which has been reset to zero before the beginning of each pulse train by means not shown, provides the phase-shift value expressed by a number which is a measure of the time which has elapsed between similar changes of the signals $B_1$ and $B_2$.

The circuit 51 detects which circuit effects the first switching operation and, in accordance with the convention adopted, derives therefrom a + or − sign, which is subsequently transferred in the form of logic signals.

At the end of the counting operation at 54 the number and sign are stored at 55, which is suitably a temporary-storage memory, for example a buffer memory. The digital values are subsequently transferred to the computing element 56, which is suitably a microprocessor. As indicated in the foregoing, the element 56 also receives, in digital form, the value of the frequency F or the wavelength of the transmitted signal as well as the value of the distance d from the element 58. In a chronological sequence the operations or calculations effected for each sawtooth by 56 are the following:

making the first algebraic value from the memory 55 equal to $\phi_0$ and the second algebraic value to $\phi'_0$;

calculating $\Delta\phi$ by forming the difference between $\phi'_0$ and $\phi_0$;

calculating $\sin \alpha$ from formula (14) ($\sin \alpha\Delta\phi$);

calculating $\phi_{\Delta\phi}$ from formula (10);

selecting the formula (12) to be used as a function of the respective signs of $\phi_0$ and $\Delta\phi$;

making the approximated calculation of k from the appropriate formula (12) and determining k;

calculating $\phi$ from the same formula (12) using the integral value of k;

calculating $\sin \alpha$ from formula (11);

calculating $\alpha$ as a function of $\sin \alpha$.

The value of $\alpha$ thus determined is transferred to the element 57, which suitably displays the value in digital form, for example in degrees and minutes or hundredths of degrees, with the aid of light emitting diodes or liquid crystals.

It is to be noted that the foregoing calculation of $\alpha$ may be simplified because, except for clarity of the explanation it is not necessary to include the approximated value of $\sin \alpha$, that is $\sin \alpha\Delta\phi$. Combining formulas (14) and (10) yields:

$$\phi = \frac{F}{\Delta F} \Delta\phi, \text{ or:}$$

$$\phi_{\Delta\phi} = \frac{F_1}{F_2 - F_1} \Delta\phi = \frac{F_1}{F_2 - F_1} (\phi'_o - \phi_o)$$

in which formula now only the values of $F_1$, $F_2$, $\phi_0$ and $\phi'_0$ occur, i.e. the actual measuring values. Regarding the accuracy which is obtained, it is to be noted that if the absolute error is the same for $\Delta\phi$ and $\phi$ after accurate calculation of the latter, the ratio ($\Delta F/F$) enables the relative error for $\Delta\phi$ to be maintained for $\phi_{\Delta\phi}$ using the last-mentioned formulas, and that the high accuracy obtained for $\phi$ is maintained in the accuracy obtained for $\alpha$.

In another embodiment of the invention, not shown, the accuracy obtained for the value of $\alpha$ may be further improved and reduced from a few hundredths of a degree approximately to one hundredth of a degree in comparison with the example where an accuracy of one degree for the phase shift measurements is obtained. In this embodiment the phase shifts of a plurality of pairs of sinewave periods of the signals Fb$_1$ and Fb$_2$ are measured by each time taking the corresponding value of the frequency (or wavelength) of the transmitted wave and assigning, to each value of $\phi_0$ thus obtained, the same angular value $\phi'_0$, which is determined from the falling edges of the signals B$_1$ and B$_2$. Thus, by means of the computing element it is possible to determine for each sawtooth as many values of sin $\alpha$ as the number of different values measured for the angle $\phi_0$ and of the frequency F$_1$ corresponding thereto, each time taking the same value for $\phi'_0$ and for F$_2$. In this case the computing element should perform an additional operation of a different nature, which for determining $\alpha$ consists of previously determining the mean of the different values found for sin $\alpha$.

Suitably, the antennas 2, 3 and 4 shown in FIG. 1 are of the directional type and cover an angular sector on the order of 60 degrees. However, they may cover a larger angle such as 120 degrees, but when determining the angle $\alpha$ this may result in a smaller accuracy than in the case of a coverage of 60 degrees. The arrangement of the six devices as described in the foregoing at 60 degrees from each other or of three devices at 120 degrees from each other, depending on whether the angle of coverage of the antennas is for example 60 or 120 degrees, makes it possible to cover the entire plane.

What is claimed is:

1. A method for determining the azimuth of a radio wave transponder relative to a radar system having first and second receiving antennas located at a distance d from each other, comprising the steps of:
   a. transmitting from the radar system to the transponder a signal having a frequency which varies linearly with time;
   b. returning from the transponder a signal representative of the transmitted signal;
   c. receiving the returned signal at the first and second receiving antennas at times which differ in relation to any differences in the distances between said receiving antennas and the transponder;
   d. mixing the signal received at each of the first and second receiving antennas with the transmitted signal and producing first and second beat signals Fb$_1$ and Fb$_2$ having frequencies fb$_1$ and fb$_2$, respectively;
   e. during a first interval following the transmission of a frequency F$_1$ at a time t$_1$, measuring the sign and magnitude of the phase shift $\phi_0$ between the signals Fb$_1$ and Fb$_2$;
   f. during a second interval following the transmission of a frequency F$_2$ at a time t$_2$, measuring the sign and magnitude of the phase shift $\phi'_0$ between the signals Fb$_1$ and Fb$_2$, the timing of said first and second intervals being chosen such that the integral number of cycles of Fb$_1$ and Fb$_2$ between t$_1$ and t$_2$ are substantially equal;
   g. determining an overall phase variation $\Delta\phi$ by performing the calculation: $\Delta\phi = \phi'_0 - \phi_0$;
   h. determining an approximate value $\phi_{\Delta\phi}$ for the phase shift between the signals Fb$_1$ and Fb$_2$ at the time t$_1$ by performing the calculation:

$$\psi_{\Delta\psi} = \frac{F_1}{F_2 - F_1} \Delta\psi;$$

i. determining the value of a constant k to the nearest integer by performing the appropriate one of the following calculations:
      1. if the sign of $\Delta\phi$ is positive, $$k = \frac{\psi_{\Delta\psi} - \psi_0}{2\pi}$$

2. if the sign of $\Delta\phi$ is negative, $$k = \frac{\psi_0 - \psi_{\Delta\psi}}{2\pi}$$

j. determining the accurate value of the phase shift $\phi$ between the signals Fb$_1$ and Fb$_2$ by performing the appropriate one of the following calculations:
      1. if the sign of $\Delta\phi$ is positive, $\phi = \phi_0 + 2k\pi$
      2. if the sign of $\Delta\phi$ is negative, $\phi = \phi_0 - 2k\pi$
   k. determining the azimuth $\alpha$ of the transponder by performing the calculation:

$$\alpha = \sin^{-1} \frac{c}{2\pi F_1 d} \psi.$$

2. A method as in claim 1 where steps e-k are repeated for a plurality of successive time intervals at times t$_i$ occurring between t$_1$ and t$_2$ at a plurality of respective frequencies F$_i$ effecting the calculation of a plurality of azimuth values $\alpha_i$ and where the azimuth $\alpha$ is determined by calculating the mean value of $\alpha_i$.

3. An apparatus for measuring the azimuth of a radio wave transponder relative to a radar system, comprising:
   a. transmitting means for transmitting from the radar system to the transponder a signal having a frequency which varies linearly with time;
   b. means for returning from the transponder a signal representative of the transmitted signal;
   c. first and second receiving antennas located at a distance d from each other for receiving the returned signal at times which differ in relation to any differences in the distances between said receiving antennas and the transponder;
   d. first means for mixing the signal received at the first receiving antenna with the transmitted signal and for producing a first beat signal Fb$_1$ having a frequency fb$_1$;
   e. second means for mixing the signal received at the second receiving antenna with the transmitted signal and for producing a second beat signal Fb$_2$ having a frequency of fb$_2$;
   f. means for measuring phase shifts $\phi_0$ and $\phi'_0$ including:
      1. a first circuit coupled to the means for producing the first beat signal Fb$_1$, said first circuit effecting production of a signal B$_1$ beginning with the first beat of Fb$_1$ following the transmission of a frequency $F_1$ at a time $t_1$ and ending upon completion of a predetermined number of beats of $Fb_1$;

2. a second circuit coupled to the means for producing the second beat signal $Fb_2$, said second circuit effecting production of a signal $B_2$ beginning with the first beat of $Fb_2$ following the transmission of the frequency $F_1$ at time $t_1$ and ending upon completion of a predetermined number of beats of $Fb_2$;

3. means coupled to the first and second circuits for detecting the phase shift $\phi_0$ between the beginnings of the signals $B_1$, $B_2$ and for determining the phase shift $\phi'_0$ between the endings of the signals $B_1$, $B_2$; and g. computing means coupled to the phase shift measuring means and adapted for:

3. determining an overall phase variation $\Delta\phi$ by performing the calculation $\Delta\phi = \phi'_0 - \phi_0$;

2. determining an approximate value $\phi_{\Delta\phi}$ for the phase shift between the signals $Fb_1$ and $Fb_2$ at the time $t_1$ by performing the calculation $$\psi_{\Delta\psi} = \frac{F_1}{F_2 - F_1} \Delta\psi$$

3. determining the value of a constant k to the nearest integer by performing the appropriate one of the following calculations:

if the sign of $\Delta\phi$ is positive, $$k = \frac{\psi_{\Delta\psi} - \psi_0}{2\pi}$$

if the sign of $\Delta\phi$ is negative, $$k = \frac{\psi_0 - \psi_{\Delta\psi}}{2\pi}$$

4. determining the accurate value of the phase shift $\phi$ between the signals $Fb_1$ and $Fb_2$ by performing the appropriate one of the following calculations:

if the sign of $\Delta\phi$ is positive, $\phi = \phi_0 + 2k\pi$
if the sign of $\Delta\phi$ is negative, $\phi = \phi_0 - 2k\pi$ 5. determining the azimuth $\alpha$ of the transponder by performing the calculation $$\alpha = \sin^{-1} \frac{c}{2\pi F_1 d} \psi.$$

4. An apparatus as in claim 3 where the transmitting means comprises means for varying the frequency of the transmitted signal in response to a repetitive sawtooth waveform.

5. An apparatus as in claim 4 where said transmitting means includes a control loop for varying the period T of the sawtooth as a function of the distance between the radar system and the transponder, said variation being effected to maintain a predetermined one of the beat frequencies substantially constant.

6. An apparatus as in claim 4 or 5 where the transmitting means comprises means for producing the frequency $F_1$ at the beginning of each sawtooth.

7. An apparatus as in claim 3, 4 or 5 where said first and second circuits of the means for measuring the phase shifts $\phi_0$ and $\phi_0'$ comprise:

a. first and second shaping circuits for converting the beat signals $Fb_1$ and $Fb_2$ to representative square wave signals $A_1$ and $A_2$, respectively;

b. first and second synchronizing circuits having inputs coupled to the respective shaping circuits for receiving the signals $A_1$ and $A_2$, each synchronizing circuit further having a start input, a stop input and an output, and producing a respective output signal $B_1$, $B_2$ beginning with the first respective square wave signal $A_1$, $A_2$ following receipt at its start input of a signal at time $t_1$;

c. means for applying respective stop signals to the stop inputs of the synchronizing circuits after time $t_2$ to effect termination of the signals $B_1$, $B_2$ when equal numbers of square wave pulses have been produced by the first and second shaping circuits; and further where said means coupled to said first and second circuits comprises:

d. an exclusive-OR-gate having first and second inputs coupled to the outputs of the first and second synchronizing circuits for receiving the signals $B_1$ and $B_2$ and for successively producing at its output pulses of duration $\phi_0$ and $\phi_0'$;

e. counting means coupled to the output of the exclusive-OR-gate for measuring the durations $\phi_0$ and $\phi_0'$; and f. a memory coupled to the output of the counting means for storing the values of $\phi_0$ and $\phi_0'$.

8. An apparatus as in claim 7 where said means for producing the first and second stop signals comprise:

a. first and second AND-gates having respective inputs for receiving the signals $A_1$, $B_1$ and $A_2$, $B_2$;

b. first and second counters coupled to the outputs of the first and second AND-gates, respectively, for counting the numbers of pulses $N_1$, $N_2$ produced thereby;

c. a comparator coupled to the outputs of the first and second counters for producing a first signal when $N_1$ is greater than or equal to $N_2$ and for producing a second signal when $N_2$ is greater than or equal to $N_1$; and d. first and second AND-gates, each having a first input coupled to the comparator for receiving a respective one of the two signals produced thereby and having a second input for receiving a signal at time $t_2$, and having respective outputs coupled to the stop inputs of the first and second sychronizing circuits for applying the respective stop signals.

* * * * *

UNITED STATES PATENT AND TRADEMARK OFFICE
CERTIFICATE OF CORRECTION

PATENT NO. : 4,464,662
DATED : August 7, 1984
INVENTOR(S) : JEAN-PIERRE TOMASI

It is certified that error appears in the above—identified patent and that said Letters Patent is hereby corrected as shown below:

WHEREVER "$\phi$" OCCURS IN THE APPLICATION CHANGE TO --$\psi$--

CLAIM 3, COLUMN 15, LINE 17 CHANGE "3" TO --1--

Signed and Sealed this

Eighteenth Day of June 1985

[SEAL]

Attest:

DONALD J. QUIGG

Attesting Officer  Acting Commissioner of Patents and Trademarks